Jan. 15, 1963    J. D. McCUNE    3,073,687
METHOD FOR THE CLEANING OF PIPELINES
Filed Sept. 28, 1961    4 Sheets-Sheet 1
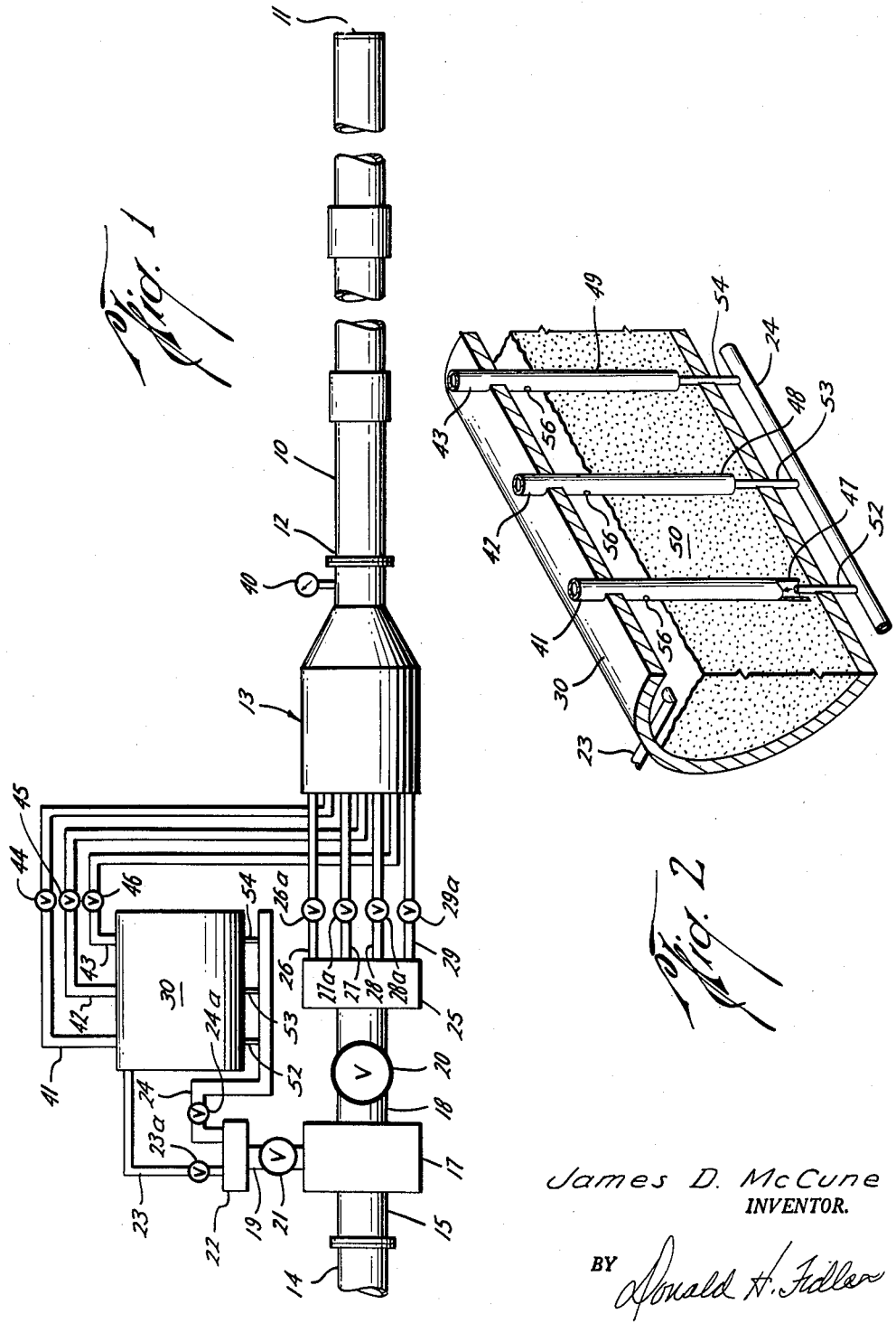
James D. McCune
INVENTOR.
BY Donald H. Fidler
ATTORNEY

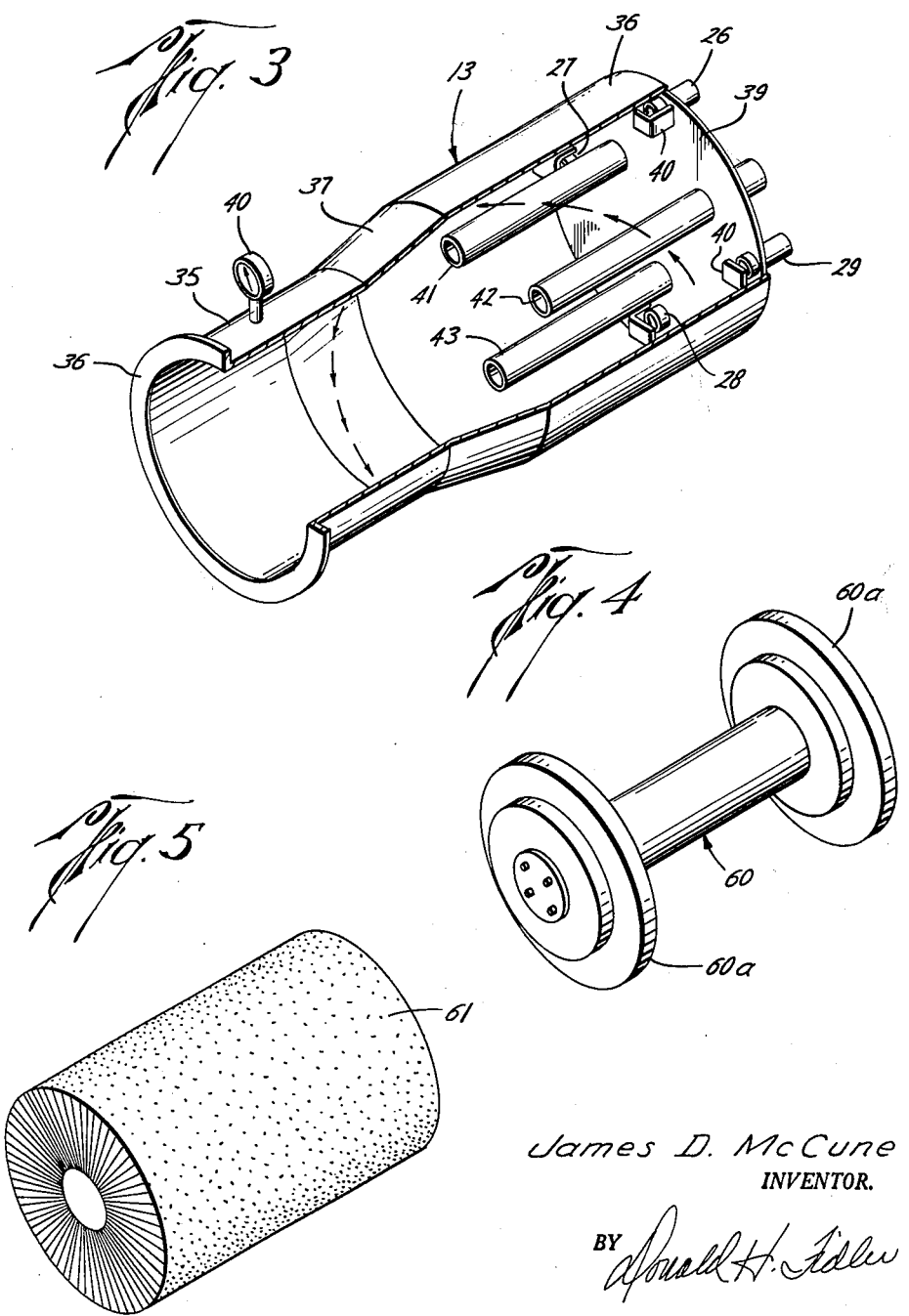

James D. McCune
INVENTOR.

BY Donald H. Fidler
ATTORNEY

James D. McCune
INVENTOR.

BY Donald H. Fidler

ATTORNEY

United States Patent Office 3,073,687
Patented Jan. 15, 1963

3,073,687
METHOD FOR THE CLEANING OF PIPELINES
James D. McCune, La Porte, Tex., assignor to Klean-Kote Incorporated, La Porte, Tex., a corporation of Texas
Filed Sept. 28, 1961, Ser. No. 141,413
1 Claim. (Cl. 51—317)

This invention relates to an improved method for increasing the transmission efficiency of a pipeline by using a cleaning process which includes an improved sand blasting technique. More particularly, this invention relates to a method of controlling the transient flow conditions of a sand-laden gas to more effectively sand blast a pipeline.

The surface roughness of the interior wall of a pipeline is a factor in the determination of the transmission efficiency of a pipeline. In a gas pipeline it has been established that in the turbulent flow region for a natural gas, the transmission or efficiency factor is a function of surface roughness and is independent of the Reynolds number. It has been found that this is true where the interior of the pipeline has substantial roughness of the order of that found in pipe as it comes from the mill. By means of the present invention, pipelines are sand blasted to improve the efficiency or transmission factor of a pipeline by not only removing rust and scale on the pipe but also by smoothing out the metal surface of the inner wall of the pipeline. Thus, the interior walls of the pipe approach the smoothness of a theoretically perfectly smooth wall pipe wherein the transmission factor increases with the Reynolds number.

The method of the present invention includes the preliminary clearing of a relatively long length of pipeline by the use of a gas drive. Following this, a gas flow in which abrasive particles are suspended is introduced into the inlet end of a pipeline while the outlet end of the pipeline is substantially open to the atmosphere. The gas flow is provided in adequate volumetric quantities so that high velocities are produced at the inlet end of the pipeline. The supply of sand in the gas flow is continued until the pressure at the inlet end indicates a minimum selected velocity has been reached whereupon the sand supply is cut off and the gas drive continued to drive the sand in the pipeline through the pipeline. Thus, a charge of sand is passed through the pipelines with selected velocity characteristics.

Accordingly, it is an object of the present invention to provde a new and improved method for said blasting gas pipelines in place in order to increase the efficiency or transmission factor thereto.

Another object of the present invention is to provide a new and improved method which sand blasts long lengths of pipelines to clean the inlet portion of each section with adequaet gas velocity.

Another object of the present invention is to provide new and improved methods wherein the efficiency of the sand blasting method is substantially improved.

Other objects, advantages and features of the invention will become apparent to one skilled in the art upon studying the specification and claims as well as the drawings wherein:

FIG. 1 is a view of a pipeline and apparatus used in performing the method of the present invention;

FIG. 2 is a partial view in cross-section of apparatus used in performing the method of the present invention;

FIG. 3 is a perspective and partially sectional view of apparatus used in performing the method of the present invention;

FIGS. 4 and 5 are perspective views of apparatus used with the present invention;

Figure 6:
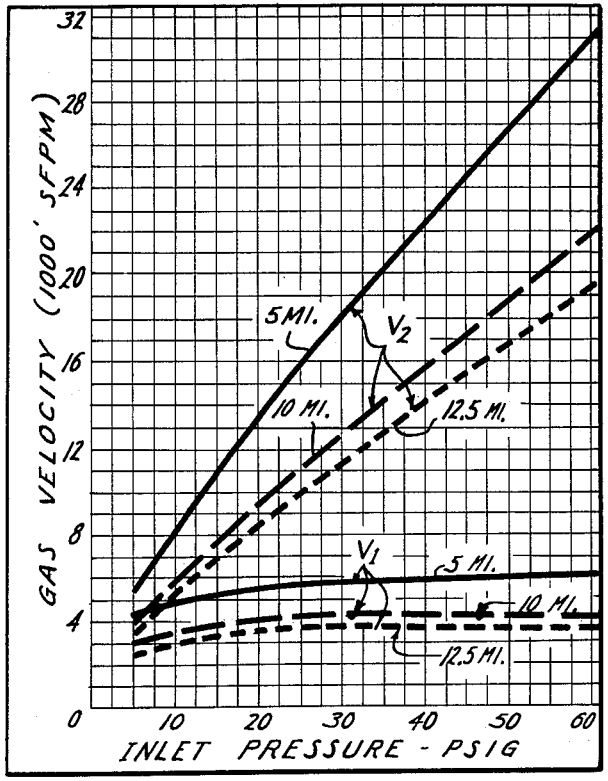
FIG. 6 is a graph showing the variation of inlet and outlet gas velocity with inlet pressure and length of pipeline for a 26" x 5/16" wall thickness pipe, the outlet pressure being atmospheric and the flow of gas being constant.

Referring now to FIG. 1, an isolated section of natural gas pipeline 10 comprised of a number of coupled lengths of pipes is illustrated with an outlet end 11 open to the atmosphere and an inlet end 12. A sand blast nozzle or head 13 may be releasably connected to the inlet end 12 in a manner which will hereinafter become more apparent. The end 14 of the pipeline from which the section 10 is isolated, is shown to the left of the inlet end 12 of section 10 and constitutes a source or supply of natural gas with sufficient quantities and pressures for the operation of the method of the present invention. For the purpose of controlling the flow of gas from the end 14 of the pipeline, the end 14 is coupled by an extension 15 to a manifold 17. A valve (not shown) may be inserted in the extension 15 to provide a shut-off control for the manifold 17 if desired. Manifold 17 in turn is provided with outlets 18 and 19 respectively having control valves 20 and 21 to control the flow of gas through the outlets. Outlet 19 from the manifold 17 is coupled to another manifold 22 which has outlets 23 and 24, the outlets 23 and 24 being connected to the sand supplying pot 30. Control valves 23a and 24a may be provided in the outlets 23 and 24 respectively. Outlet 18 from manifold 17 is connected with another manifold 25 which has outlets 26–29 connected to nozzle 13 and respectively having control valves 26a–29a. Sand supply pot 30 has mixture feed pipes 41–43 coupled to the nozzle 13, the feed pipes respectively have valves 44–46.

Referring now to FIG. 3, the nozzle 13 is comprised of a front end portion 35 with an internal diameter similar to the diameter of the pipeline to be cleaned and may include a flanged end 36 suitably arranged for a quick connect and disconnect coupling to the end of the pipeline. The front end portion 35 of the head 13 is joined by a frusto-conical section 37 to a rearward end portion 36 having a relatively larger diameter than the front end portion 35. The gas outlet pipes 26–29 from the manifold 25 are received in a rear plate 39 of the nozzle 13 with their centers disposed upon a circle having a diameter substantially equal to that of the diameter of the pipe to be cleaned, the centers being equiangularly disposed about the circle. Baffles or deflectors 40 are mounted within the nozzle 13 and disposed over the respective open ends of the gas outlet pipes 26–29 to deflect the gas circumferentially around the head so that the gas effectively travels in a spiral path within the rearward portion (shown by the arrows) and is contracted as it is passed by the frusto-conical section 37 into the front end portion 35. Mixture inlet pipes 41–43 from the sand-supplying pot 30 are inserted through the rear plate 39 of the nozzle 13 and are generally equiangularly spaced about a circle which has a diameter substantially less than the diameter of the pipeline to be cleaned. The pipes 41–43 generally lie within the periphery of an imaginary cylinder extended rearwardly from the inner wall of the forward end section 35. The open ends of the mixture pipes 41–43 are spaced slightly to the rear of the frusto-conical section 37 so that the sand and gas mixture exiting from the pipes 41–43 is picked up by the swirling gas and compressed in the frusto-conical section 37 for introduction to the inlet end of the pipeline. A pressure gauge 40 is connected to the forward end 35 of the head 13.

The sand-supply pot 30 (FIGS. 1 and 2) includes the sand and gas mixture pipes 41–43 which respectively contain valves 44–46 and include pipe sections 47–49 which extend from an upper or top portion of the pot downwardly to a point just below the bottom or lower portion of the pot. The pot 30 is generally a cylindrically-shaped, closed vessel which contains access openings (not shown) through which sand 50 may be deposited within the pot. Gas feed pipes or jets 52–54 are arranged and respectively aligned with the open, lower ends of the pipe sections 47–49 and are coupled to the gas outlet 24. The open end of jet pipes 52–54 are substantially aligned with the open ends of pipes 47–49 on a common horizontal plane. Hence, gas introduced through pipe 24 and jets 52–54 may drive sand in the container upwardly through the respective pipe sections 47–49. To provide a mixing and boosting action, the pipe sections 47–49, near their upper ends, are provided with openings 56 and the gas outlet 23 is arranged to enter the pot and introduce gas into the upper portion of the pot above the sand level. Hence, gas under pressure enters through the openings 56 in the pipe sections 47–49 to further lean out the mixture of sand and gas through the pipe sections and carry the sand to the nozzle 13.

In general, the method of the present invention includes the following procedural steps: The pipeline 10 is cleared preliminarily by the purge of gas through the line while the end 11 is open to the atmosphere. This may be done, for example, by connecting up the head 13 and preliminarily opening the valves 26a–29a. Control valve 20 is then opened to permit flow of gas into the pipeline. After the line has been purged by the gas for a suitable length of time, the head 13 is disconnected and a pig 60 (FIG. 4) inserted in the end of the line. The pig 60 may, for example, be a spool type arrangement with cup like rubber washers 60a at its ends, the washers being sized to the diameter of the pipeline. After the pig 60 is inserted into the pipeline, the head 13 is connected up to the pipeline again and valve 20 opened to blow or drive the pig through the line by the pressure of gas from outlet 18. The pig serves to clear the line of any debris or fluid which may be in the line and also insures that there are no air pockets left in the line. After the pig 60 is blown clear of the end of the pipeline 11, the valve 20 is closed and the line is permitted to return to atmospheric pressure. Preliminary to the next step of the operation, the valves 23a, 24a are opened. Valve 21 is then opened to supply gas to the container 30 which feeds sand to the nozzle 13 and simultaneously therewith or shortly thereafter, valve 20 is opened to admit gas under pressure to the nozzle 13 to drive the sand through the pipeline. The gas pressure to the pot 30 via outlet 19 is maintained greater than the pressure of the gas supply to the nozzle 13 via outlet 18 to insure the feeding of the sand to the nozzle and into the line. A given charge or amount of sand suspended in gas at high velocities is admitted to the line during a short period of time as determined by the inlet pressures, the sand supply being cut off by operating valve 21 at the end of this time period and the gas drive is continued to propel the high velocity charge of sand admitted to the line entirely through the pipeline 10 to the outlet 11. After the charge of sand is entirely through the line, the gas drive valve 20 is closed and the pipeline is once again permitted to return to atmospheric pressure. As soon as the pipeline has returned to atmospheric pressure, the sand blasting step may be repeated. The number of sand blasting operations necessary depends upon the moisture in the line and the degree of cleaning desired. In general, the interior of the line cleans to bright surface and subsequent operations may be conducted to further hone or polish the inside of the pipeline to a smooth finish. The progress of the entire cleaning operation may be roughly determined by an examination of the sand charge as it exhausts from the pipeline. For example, during the first sand blasting operation, the sand charge exhaust will invariably be noted as extremely cloudy and dirty. As each blast is performed it will be noted that the particulate material in the exhaust becomes lighter and lighter in color as more and more cleaning is accomplished. The cleaning may be adjudged finished when the sand comes out in substantially the same color as it was applied in the input. At this time the interior of the pipeline will also be bright with a polished smooth interior surface. To remove any remnant sand or dust which may have been dropped out in joints or along the length of the line, a cleaning pig 61 as shown in FIG. 5, may be used. Pig 61 contains fine wires arranged to brush the interior of the pipeline.

To understand the principles of the present invention as best understood, reference is made to the graph of FIG. 6 which is based upon the Weymouth formula. The Weymouth formula has been found to provide a very close approximation of the relationship of the various factors involved in the sand blasting process. This formula can be expressed as follows:

$$Q = 0.6 d^{2.67} \sqrt{\frac{P_1^2 - P_2^2}{L_m}} \qquad (1)$$

for natural gas with a specific gravity of 0.6 and where $Q$ = standard cubic feet of flow per minute
$d$ = inside diameter of pipe in inches
$P_1$ = initial pressure in pounds per square inch absolute
$P_2$ = outlet pressure in p.s.i.a.
$L_m$ = length of line in miles where the temperature of the gas is considered constant at 70° F.; the gas quantity Q is constant; and the effect of sand on the gas flow is neglected. The inlet and outlet velocities, as related to the above formula, are obtained from the following relationships:

$$Q = \frac{V_2 A P_2}{P_s} \qquad (2)$$

$$Q = \frac{V_1 A P_1}{P_s} \qquad (3)$$

where $V_1$ is equal to inlet velocity in feet per minute; $V_2$ is equal to outlet velocity in feet per minute; A equals the pipe area in square feet; and $P_s$ equals standard atmospheric pressure in p.s.i.a.

As shown in FIG. 6, a plot is made of velocities versus pressure for steady state gas flow in pipelines of 5, 10 and 12.5 miles length of a 26 inch diameter pipeline where the outlet end is open to the atmosphere. In FIG. 6, the inlet velocity $V_1$ (feet per minute) at the inlet end of a pipeline is denoted by $V_1$ and the outlet velocity (feet per minute) at the outlet from the pipeline as $V_2$, the outlet pressure being atmospheric. The graph illustrates the relationship between inlet and outlet velocities for various steady state flow conditions. For example, with a pipeline of the given diameter of 26 inches, a given quantity of natural gas flowing for a sufficient period of time at a give ninlet pressure will provide constant inlet and outlet velocities. For example, it will be noted that an inlet pressure of 20 p.s.i.g. for a ten-mile section of pipeline will provide a sand blasting inlet velocity $V_1$ of about 4000 feet per minute. With this inlet pressure and velocity, the outlet velocity $V_2$ is about 9500 feet per minute. It might be supposed that by increasing the inlet pressure that the inlet velocity could be markedly increased. However, as the plot shows, when the quantity of flow and accordingly the inlet pressure is increased, for example, to sixty pounds, the inlet velocity is only about 4300 feet per minute, whereas the outlet velocity increases to about 22,000 feet per minute. In sand blasting of pipelines it has been found that it is necessary to provide a minimum inlet velocity to clean the inlet end of the line and keep the sand in suspension yet the outlet velocity should not be too great so as to cut away too much of the metal of the outlet end of the pipeline. Suitable inlet and outlet velocities may vary according to the diameter of the pipeline. For example, an outlet velocity of 16,000 to 20,000 feet per minute is not excessive for a 26" diameter pipeline while an outlet velocity 9000–13,000 feet per minute is not excessive for a 12" diameter pipeline. In general, the greater the velocity, the greater the cleaning action. Since the cleaning action actually removes metal from the interior of the pipe, it should be obvious that the maximum velocities encountered or employed should be considered in terms of how much metal removal from the pipe can be tolerated. With outlet velocities of 16,000 feet per minute, as much as 0.002 inch has been removed from a pipeline. Inlet velocities should, in general, be great enough to carry the sand through the pipe in an agitated or turbulent condition which enhances the cleaning action. Turbulence can, of course, be figured from the Reynolds number for the flow of gas through a particular pipeline. Inlet velocities of 4000 feet per minute may be acceptable in some cases whereas, in general, the higher the inlet velocity the more effective the cleaning action. In the present invention, a controlled range of velocities including high inlet sand blasting velocities are maintained for propelling the sand into and through the length of pipeline.

Turning now to the principles underlying the present invention, consider first that a relatively long length of pipeline is at atmospheric pressure along its length. By a relatively long length of line several miles are meant, say on the order of 3 to 10 miles or more although lesser lengths may be cleaned by the use of the present invention. The length of line between the inlet and outlet is thus great enough that at least several minutes are required for the pipeline to achieve steady state flow conditions. Diameter of the pipeline may be on the order of 6 to 30 inches or more although smaller diameters may be cleaned by the use of the present invention. Hence, with a relatively long length of pipeline that is at atmospheric pressure, a gas and sand mixture as it is first admitted in to the inlet of the pipeline is at a high velocity and a low pressure while the outlet of the pipeline is open to the atmosphere. The high velocity of the mixture at the inlet end, of course, serves to clean the inlet end of the pipeline with ease. However, even with the outlet of the pipeline open to the atmosphere, as the admission of the gas and sand mixture is continued, the inlet pressure increases while the inlet velocity decreases; so, in accordance with the invention, at a point where the inlet pressure reaches a predetermined value which is less than the pressure value for steady state flow conditions, the sand supply is cut off and the gas drive is continued to drive the thus formed charge of sand and gas through the pipeline, the inlet pressure value then rising to a steady state flow value. It should be appreciated that several minutes elapse during the pressure build-up at the inlet to the steady state flow conditions when the velocity of the gas at the inlet is substantially lower than the velocity of the gas at the outlet. A graphical impression of this method is that a charge or length of sand is propelled through the pipeline by a gas drive and has a leading end at high velocities and a trailing end at lower velocities not less than a predetermined minimum value. This predetermined minimum value of the charge of sand avoids the inclusion in the sand train of elements of sand carried at such low velocities that the sand would drop out of suspension or fail to clean as effectively as sand carried at higher velocities. After the sand train is clear of the outlet end of the pipeline, the gas drive is discontinued and a time interval permitted to elapse until the inlet of the line returns to substantially atmospheric pressure. Then the above operation is repeated as many times as necessary to clean the line.

To understand the basis for the present invention, consider the conditions to achieve a steady state flow where an outlet velocity of 16,000 feet per minute is selected as adequate for cleaning a relatively large diameter line of say, 26 inches in diameter. Assuming that the outlet pressure $P_2$ (a short distance, i.e., about 10 feet inwardly of the outlet end) is 14.8 p.s.i.a., from Formula 2 Q can be calculated as follows:

$$Q = \frac{16,000(\pi)(d^2)(14.8)}{(4)(144)(14.7)} = 87.5 d^2 \qquad (4)$$

and for the 25.312" actual inner diameter, $Q = 56,100$ cubic feet per minute. Substituting the expression for Q found in Equation 4 in the Formula 1 and solving for $P_1$ in p.s.i.a. for a "d" of 25.312 inches of inside diameter gives the following expression $$P_1^2 = \frac{21,420 L_m}{d^{1.34}} + 219 = 282 L_m + 219 \qquad (5)$$

Figure 7:
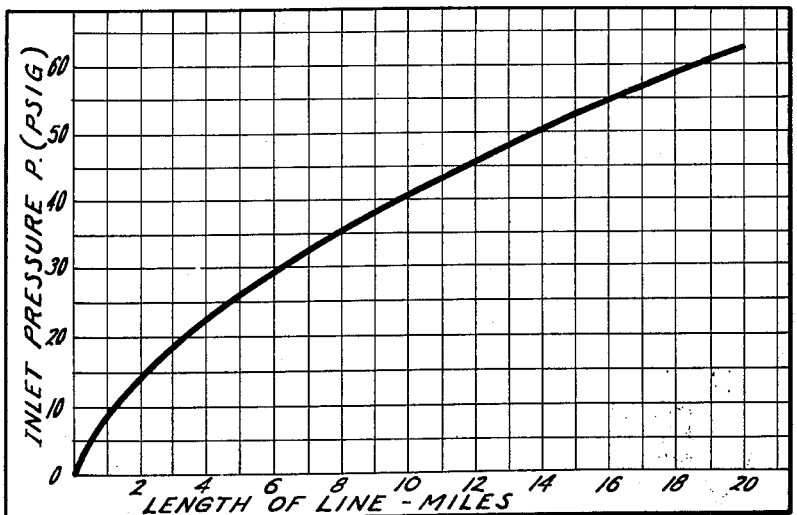
FIG. 7 is a graph showing the pressure valves with constant flows of gas plotted against varying lengths of pipeline.

Equation 5 is plotted in FIG. 7 for values of $P_1$ versus values of $L_m$.

The expression for the inlet velocity $V_1$ from Formula 3 is:

$$V_1 = \frac{87.5 d^2 (14.7)(4)(144)}{\pi d^2 P_1} = \frac{236,000}{P_1} \qquad (6)$$

Figure 8:
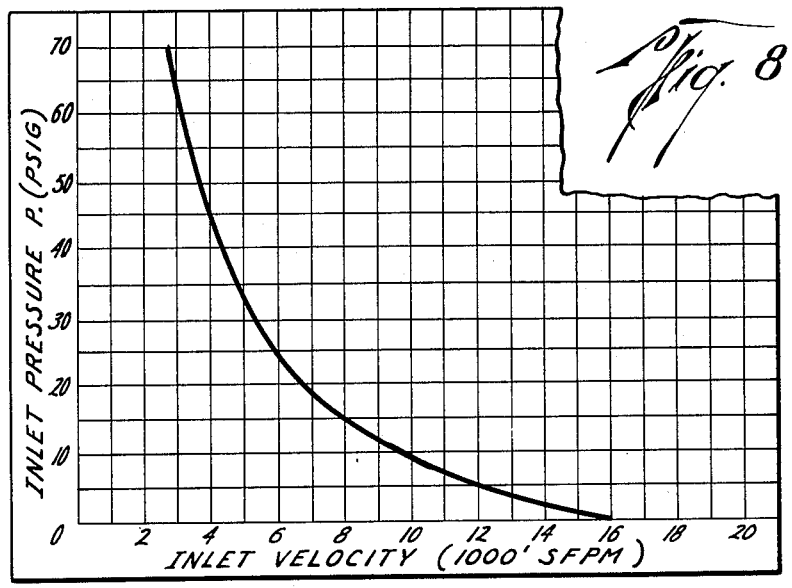
FIG. 8 is a graph showing the pressures values with constant flows of gas plotted against velocity values.

Equation 6 is plotted in FIG. 8 for values of $P_1$ versus values of $V_1$.

Thus, from Formula 4 the Q necessary to develop an outlet velocity of 16,000 feet per minute is determined from the diameter of the line. From the diameter and length of line, the linet pressure $P_1$ can be calculated from Formula 5. From Formula 6 the relationship of $V_1$ and $P_1$ can be calculated. For the above example of a 26" diameter line, various values of $L_m$ versus $P_1$ as well as $V_1$ versus $P_1$ as plotted in FIGS. 7 and 8 provide a relationship therebetween for a steady state flow condition in the pipeline. For example, as shown in FIG. 7, where a pipeline of 26 inch diameter is 10 miles long, the pressure $P_1$ will build up to a steady state flow value of 41 p.s.i.g. During the time $P_1$ is building up to 41 p.s.i.g., the velocity $V_1$ decreases from 16,000 feet per minute to 4300 feet per minute and would remain constant for a continued steady state flow.

From graphs of FIGS. 7 and 8, for a 10 mile length of pipeline, an operation according to the method of the present invention can be planned and conducted as follows:

(a) The quantity of gas Q necessary to provide for a velocity $V_2$ of 16,000 feet per minute from Equation 4 is found to be equal to 56,100 cubic feet per minute;

(b) The inlet pressure $P_1$ for a 10 mile pipeline necessary to develop an outlet velocity of 16,000 feet per minute is equal to 41 p.s.i.g. from the plot of FIG. 7. Hence, from FIG. 8 it will be known that when the inlet of line is brought up to a pressure of 41 p.s.i.g., the gas flow is stabilized and the inlet velocity at this time will be 4300 feet per minute;

(c) A minimum sand or mixture velocity is selected. For example, a sand and gas minimum velocity of 6000 feet per minute can be selected for the 26" diameter line. Referring then to FIG. 8, it can be determined a velocity of 6000 feet per minute is reached when the inlet pressure $P_1$ is equal to 25 p.s.i.g.;

(d) The valve 20 is marked in any suitable manner to indicate the position to which it can be opened so that the pressure to the head 13 is limited to 41 p.s.i.g.

The sand blasting operation is then carried out as follows: After the initial clearing operation, the pipeline is allowed to come to atmospheric pressure. The pot 30 is then operated to feed sand and gas to the nozzle 13, and the valve 20 is opened to its premarked position where the inlet pressure $P_1$ of the supply will build up to 41 p.s.i.g. The pressure gauge 40 on the inlet of the pipe is then watched until the pressure in the line builds up to 30 p.s.i.g. At this time, the pot 25 is disconnected by closing valve 21 to discontinue the sand supply while the inlet pressure of the gas supply continues to build up to 41 p.s.i.g so that the continued gas drive drives the charge of sand through the pipe while the pressure builds up to the selected value of 41 p.s.i.g. During this operation the first increment of sand and gas mixture is initially carried into the inlet at 16,000 feet per minute and subsequent increments are carried at lesser velocities terminating with the increment of sand and gas mixture carried at 6000 feet per minute when the pressure gauge 40 reads 25 p.s.i.g. Thus, a charge of sand with a leading and a trailing edge at high velocities is carried through the line. The sand in the charge is at all times at a relatively high velocity to insure maximum efficiency of the operation. After reaching the pressure of 41 p.s.i.g., the gas drive is continued until the charge of sand is clear of the outlet end of the pipe. As soon as the charge of sand is through the entire section of pipeline, the valve 20 controlling the gas drive in the nozzle is shut off and the pipeline permitted to return to atmospheric pressure. The sand blasting step is then repeated if the line has not been entirely cleaned. Each time following the passage of a charge of sand through the pipeline, the line is permitted to return to atmospheric pressure. The reason for this is that the low pressure at the inlet end of the pipeline permits higher inlet velocities to be obtained. The steps of sand blasting are continued until the line is cleaned. It should be appreciated that generally several minutes elapse before the pressure builds up to a steady state value in the pipeline.

Figure 9:
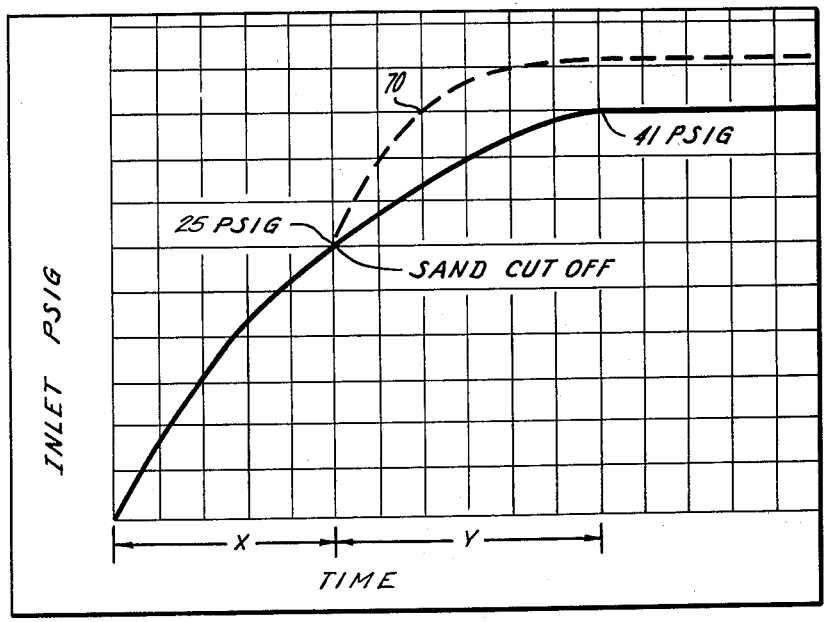
FIG. 9 is a graph of pressure build-up with a flow of gas plotted against a time base.

The above-described operation may be further understood by a reference to FIG. 9. In FIG. 9, the inlet pressure to the pipeline is plotted as a function of time. The inlet pressure $P_1$ builds up to the selected pressure of 25 p.s.i.g. for the given flow rate Q in a time $x$ and to the selected pressure of 41 p.s.i.g. in a following time $y$ and remains constant thereafter. The charge of sand introduced into the pipeline during the time interval $x$ will exit from the pipeline over a time interval which is greater than the time $x$ due to the gas expansion in the line. If it is observed that the charge of sand as it exits from the pipeline is increased in length to a point where the sand and gas mixture appears too thin for the most effective cleaning action, the length of the charge of sand while it is travelling through the pipeline may be decreased by increasing the flow rate Q (and hence the inlet pressure $P_1$) after the sand supply is cut off (at 25 p.s.i.g.) which drives the trailing segments of the charge of sand at higher velocities. This effect is illustrated by the dashed line curve 70 in FIG. 8. Increasing the flow rate Q, of course, also increases the overall velocity of the charge of sand and the outlet velocities.

It will be appreciated that a plot of values similar to FIGS. 7 and 8 can be made for the various diameter lines to be cleaned by the process of the present invention. To make the charts all that need be assumed is the outlet velocity.

While sand of various particle size can be used, it is preferred that it have a particle size such that substantially all of it will pass a 30 mesh screen and substantially all will be retained on a 70 mesh screen. A suitable sand, for example is Clemtex #3 which may be obtained from the Clemtex Corporation of Houston, Texas. Of course, the particle size distribution between these two mesh sizes can vary, but it is preferred that it be concentrated in the smaller particle size portion of the range.

It has been found that after the sand has been used for sand blasting, such as by passing through ten miles of 26 inch pipe, the sand particles are broken up so that, for example, starting with the above-sized sand, about 10% will pass a 200 mesh sieve and only about ¾ will be retained on a 70 mesh sieve. Nevertheless, microscopic examination of the particles indicates that they are even sharper than those of the original sand. This increase in sharpness is due to fracturing of the sand along its crystal planes, resulting in very sharp edges. Thus, the effectiveness of the sand is not lost as it moves down the pipe, but on the contrary, with increased sharpness and velocity, its ability to clean and polish the pipe interior becomes more effective.

While particular embodiments of the present invention have been shown and described, it is apparent that changes and modifications may be made without departing from this invention in its broader aspects and, therefore, the aim in the appended claim is to cover all such changes and modifications as fall within the true spirit and scope of this invention.

What is claimed is:

A method of cleaning a plurality of pipe lengths which are coupled to form a relatively long section of pipeline, comprising the steps of: injecting a mixture of gas and sand into an inlet end of the pipeline section with the pipeline section initially at substantially atmospheric pressure and with the pipe length adjacent the other end open to substantially atmospheric pressure, cutting off the sand supplied to the inlet end to form a charge of sand in the pipeline section while continuing the injection of gas at an increasing pressure, said sand being cut off when said inlet pressure is at a given value at which the velocity of gas is still capable of maintaining substantially all of the sand charge in suspension, the injection of gas after cut off of sand being continued at least until the inlet pressure has increased to a value substantially greater than said given value and the inlet velocity of the gas has decreased below the minimum velocity required for effective cleaning by a sand-gas mixture, and at least for a time sufficient to ensure driving the sand charge out of the pipeline section.

References Cited in the file of this patent
UNITED STATES PATENTS
1,890,164    Rosenberger _____ Dec. 6, 1932